(12) United States Patent
Amita (10) Patent No.: US 6,690,293 B2
(45) Date of Patent: Feb. 10, 2004

(54) GATE APPARATUS, ON-BOARD UNIT, SETUP METHOD OF THE ON-BOARD UNIT, TOLL COLLECTING METHOD AND JUDGING METHOD OF THE ENTRANCE AND EXIT

(75) Inventor: Kozo Amita, Kanagawa-ken (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 274 days.

(21) Appl. No.: 09/840,127

(22) Filed: Apr. 24, 2001

(65) Prior Publication Data

US 2002/0021228 A1 Feb. 21, 2002

(30) Foreign Application Priority Data

Apr. 24, 2000 (JP) ...................................... P2000-122214

(51) Int. Cl.[7] .................................................. G08G 1/00
(52) U.S. Cl. .......................... 340/928; 340/933; 705/13; 705/41
(58) Field of Search .......................... 340/928, 825.69, 340/933, 10.51, 994, 905, 10.4; 705/13, 41; 701/117; 235/384, 375

(56) References Cited

U.S. PATENT DOCUMENTS

| | | | | | |
|---|---|---|---|---|---|
| 5,204,675 | A | * | 4/1993 | Sekine | 340/933 |
| 5,422,473 | A | * | 6/1995 | Kamata | 235/384 |
| 5,805,082 | A | * | 9/1998 | Hassett | 340/928 |
| 5,872,525 | A | * | 2/1999 | Fukasawa et al. | 340/928 |
| 5,955,970 | A | * | 9/1999 | Ando et al. | 340/928 |
| 6,019,285 | A | * | 2/2000 | Isobe et al. | 235/384 |
| 6,025,784 | A | * | 2/2000 | Mish | 340/693.5 |
| 6,042,008 | A | * | 3/2000 | Ando et al. | 235/384 |
| 6,339,384 | B1 | * | 1/2002 | Valdes-Rodriguez | 340/928 |
| 6,342,844 | B1 | * | 1/2002 | Rozin | 340/933 |
| 6,396,418 | B2 | * | 5/2002 | Naito | 340/928 |

* cited by examiner

Primary Examiner—Toan Pham
(74) Attorney, Agent, or Firm—Pillsbury Winthrop LLP (57) ABSTRACT

A gate apparatus for judging the entrance and exit of a vehicle, which is attached with a wireless tag that is stored with a data peculiar to the vehicle, and, on which an on-board unit having a wireless communication function is mounted. In the gate apparatus, the data peculiar to the vehicle is procured by the wireless communicating with the wireless tag, and the data of the on-board unit stored in the on-board unit and IC card data set in the on-board unit are procured by the wireless communicating with the on-board unit.

10 Claims, 7 Drawing Sheets

GATE APPARATUS, ON-BOARD UNIT, SETUP METHOD OF THE ON-BOARD UNIT, TOLL COLLECTING METHOD AND JUDGING METHOD OF THE ENTRANCE AND EXIT

BACKGROUND OF THE INVENTION

1. Field of the Invention

The present invention relates to gate apparatus that are introduced into toll facilities such as toll parking lots, toll roads, toll bridges, on-board units mounted on vehicles, setup method of onboard unit and toll collecting method and judging method of the entrance and exit.

2. Description of the Related Art

For example, at toll facilities such as express highway, a nonstop automatic toll collection system (ETC system) by which the issuance of pass at the entrance is no more required and the toll collection is executed automatically at the exit, is now on the stage of practical use.

Normally, a vehicle class discriminator and an automatic ticket issuing machine are provided at the entrance of the toll road and the vehicle entering the entrance is detected by a vehicle class discriminator comprising various detectors. As the result of the detection, the vehicle class is discriminated automatically, and a ticket recorded with vehicle class, number of the tollgate, the entrance entered, date and time of entrance is issued automatically by the ticket-issuing machine. Therefore the entrance is unmanned.

On the other hand, in recent years, an electronic toll collecting system (Electronic Toll Collection System: ETC system) that performs toll settlement using a wireless communication is under examination for introduction.

In this ETC system, a vehicle is provided with an on-board unit which is provided with an IC-card which stores the ID of users private person, the control number of the vehicle, data of the entrance and exit and the like, and a wireless communication function and on the other hand, at the entrance and the exit of the toll road, entrance gate apparatus and exit gate apparatus are installed, which exchange data by wireless communication with the on-board unit and collects the toll.

The entrance gate apparatus writes in the entrance data in the on-board unit by communicating with the on-board unit, and the exit gate apparatus performs a calculation of the toll basing upon the data of the entrance, data of vehicle obtained by a wireless communication with the on-board unit at the exit and request the host computer that is an apparatus of a higher rank to draw the toll from the account, and then transmits to the vehicle the data for writing in such as the result of the processing to write the result of the processing in the on-board unit. As described in the above, the ETC system makes it possible to collect the toll for the respective vehicles unmanned.

However, the automatic toll collection can be performed in the range of 99 and several tenths percent, even in the case of ETC system, which seems to be ideal, and the remaining vehicles must be processed manned.

In other words, vehicles of various sizes, outer shapes, and utilization are travelling on the roads. For example, emergency vehicles such as ambulance cars, fire engine trucks, the cars that are driven by physically handicapped persons, omnibuses that travel in route and sight seeing buses, both of which the outlooks are same but belong to different categories for the tolls, trailers which travel in the state that two cars are connected, (traction engines) and further vehicle of which outlook are modified and which are approved for travelling on public roads.

Though these vehicles may utilizes the toll roads, the vehicle class discriminator of the prior art depends on the infrared sensors, stepping sensors, cameras for recognizing the number, which discriminate the vehicles by the outlooks. Therefore, it is almost impossible to discriminate all the classes of vehicles exactly, and it can not be said that the discriminating system of the prior art is perfect from the viewpoint of accuracy.

On the other hand, when an ETC system should be introduced, not only the operating enterprise of the toll installation should install various apparatus in the entrances and exits of the respective facilities, but also the users and car dealers have to take following procedures from the time of application for the ETC utilization, until they may utilize actually ETC system.

And car shops sell the on-board units, which can be used for ETC system. The users who are desirous to receive services of ETC using this on-board unit, have to file an application with a certain organization (hereinafter called operating enterprise) such as highway road enterprise after they have procured on-board units and to setup the data necessary for automatic toll collection provided by the operating enterprise.

In this case, the user is to mount an on-board unit that is procured from a car dealer or a car shops on the vehicle. This mounting work may be performed by the users by himself, however, normally the mounting works is ordered from the dealer, from whom the on-board units was purchased, as it might cause troubles of the vehicle, if the user were not familiar with the electric system inside of the vehicle.

For example, when the car dealer mounts an on-board unit on the user's vehicle, the car dealer fills up the necessary items in a application form attached to the on-board unit, and mails the same together with a copy of automobile inspection verification of the vehicle, that the user has, to the operating enterprise.

The operating enterprise prepares an IC-card, in which the following data are stored, to be used exclusively for setup (hereinafter called as setup card) and returns the same to the car dealer or to the user. The data to be stored in the setup card are the number of the on-board unit, the data of the on-board unit proper, and the data on the key necessary for security, and the like.

When the car dealer has received the setup card from the operating enterprise, the car dealer informs the user of the receipt of the setup card, and fixes the date for mounting the on-board unit with the user and mounts the on-board unit in a short time on the vehicle in that day, when the car dealer has received the vehicle from the user. Thereafter, the setup card is set into the on-board unit and operating the on-board unit carries out the setup work.

When the setup card is set in the card slot of the on-board unit, the on-board unit reads in the data stored in the setup card and checks whether or not the card set is a right setup card, and whether or not the data of the on-board unit coincide with data of setup card and so on. When all the checks are OK'd, the data of the setup card are stored in the memory of the on-board unit and then the on-board unit can be used.

Then, the vehicle with the on-board unit, which setup is completed, is returned from the car dealer to the user, and the user can receive services of ETC, when the user drives the vehicle and enters into a toll road.

Also, the user may replace the vehicle with a new one after several years, even when the user made a registration of the on-board unit. In such a case, in other words, when the registration of the vehicle is changed or when the on-board unit is mounted on another vehicle, it becomes necessary to change the data of the on-board unit proper stored in the on-board unit. In this case it is also necessary to perform the procedure.

Furthermore, in case two or more vehicles are connected each other and are driven, it is not possible to judge the connecting condition by the data obtained by photographing the number plate of the first vehicle by a camera, it is also necessary to register additional data peculiar to the vehicle on the on-board unit through the IC card or to change the registered data. In this case also, it is necessary to perform the procedure, the working volume of the user increases always and the operation and the management of the system become complicate.

As described in the above, in the case of the gate apparatus of the prior art, the vehicle class discrimination is performed by detecting the outlook of the vehicle, and the system is not perfect in regard to the accuracy of the detecting the vehicle class and also there has been a problem that the check and the management of entrance and exit of the vehicles that utilize the toll facilities can not be automated completely.

Also, the user has to procure a setup card through a complicate procedure and to perform a setting up work, before the user may utilize the toll facilities. If so, even if the system is prepared to offer an excellent service, the users and car dealers think it difficult and this prevents the increase of the users of the services and becomes a reason for preventing the generalization of the system.

SUMMARY OF THE INVENTION

An object of the present invention is to provide a gate apparatus, an on-board unit, a setup method for the on-board unit and a toll collection method and a judging method of the entrance and exit of the vehicles, which can automates the check and the management of the entrance and exit of the vehicles utilizing the toll facilities completely.

Also, an other project of the present invention is to provide a gate apparatus, an on-board unit, a setup method for the on-board unit and a toll collection method and a judging method of the entrance and exit of the vehicles, which are able to contribute the generalization of the service, by making the setup of the data for utilizing the toll facilities and their services in the on-board unit mounted on the vehicle easily.

According to the present invention, there is provided a gate apparatus for judging the entrance and exit of a vehicle, which is attached with a wireless tag that is stored with a data peculiar to the vehicle, and, on which an on-board unit having a wireless communication function is mounted, comprising first wireless communication means for procuring the data peculiar to the vehicle by the wireless communicating with the wireless tag; and second wireless communication means for procuring the data of the on-board unit stored in the on-board unit and IC card data set in the on-board unit by the wireless communicating with the on-board unit.

Furthermore, according to the present invention, there is provided an on-board unit, which is mounted on a vehicle attached with a wireless tag in which a data peculiar to the vehicle is stored, and which may utilize a contracted service after a data for the user of the vehicle to utilize the contracted service is registered in a memory, comprising wireless communication means for transmitting the data stored in the memory, in case the data is requested by wireless communication by a wireless apparatus of the contracted service presenting side before the registration; and registering means for registering an unregistered data in the memory, in case the unregistered data is answered back to the memory by wireless communication to the data transmitted by the wireless communication means.

Also, according to the present invention, there is provided a setup method of an on-board unit, which is mounted on a vehicle attached with a wireless tag in which a data peculiar to the vehicle is stored, and which may utilize a contracted service after the data for the user of the vehicle to utilize the contracted service is registered in a memory, comprising the steps of obtaining the data peculiar to the vehicle by wireless communicating with the wireless tag; obtaining a data of the on-board unit stored in the on-board unit and an IC card data set in the on-board unit, by the wireless communicating with the on-board unit; judging whether or not an unregistered data can be registered by comparing the obtained data peculiar to the vehicle and the IC card data, when the data necessary for judging the entrance and exit of the vehicle is not yet registered among the procured data of the on-board unit; and registering the necessary data included in the data peculiar to the vehicle into the on-board unit through the wireless communication, when the unregistered data can be registered as the result of the judging step.

Furthermore, according to the present invention, there is provided a toll collecting method using an on-board unit, which is mounted on a vehicle attached with a wireless tag in which a data peculiar to the vehicle is stored and, in which a data for a user of the vehicle to utilize an automatic toll collection service is registered, the toll collection method comprising the steps of: obtaining the data peculiar to the vehicle by wireless communicating with the wireless tag; obtaining a data of the on-board unit stored in the on-board unit and an IC card data set in the on-board unit, by the wireless communicating with the on-board unit; judging a discrimination of the vehicle class and a propriety of the utilization of the automatic toll collection service basing upon the procured data of the on-board unit and the IC card data and the data peculiar to the vehicle; and performing toll collection process for the vehicle that may utilize the automatic toll collection service corresponding to the judged vehicle class as the result of the judging step.

Also, according to the present invention, there is provided a judging method for judging a propriety of the entrance and exit of a vehicle by wireless communicating with an on-board unit having a wireless communicating function mounted on the vehicle, when the vehicle attached with a wireless tag in which a data peculiar to the vehicle is stored enters and exits from a toll facilities, comprising the steps of obtaining the data peculiar to the vehicle by the wireless communicating with the wireless tag; obtaining an IC card data set in the on-board unit from the on-board unit by the wireless communicating with the on-board unit; discriminating a vehicle class and judging a propriety of the utilization of the toll facilities basing upon the IC card data and the data peculiar to the vehicle; and permitting the entrance and the exit to the toll facilities for the vehicle that is judged as permissible to utilize the toll facilities as the result of the judging step.

DETAILED DESCRIPTION OF THE PREFERRED EMBODIMENTS

Hereinafter, the first embodiment of the present invention is described in detail by referring the drawings.

Figure 1:
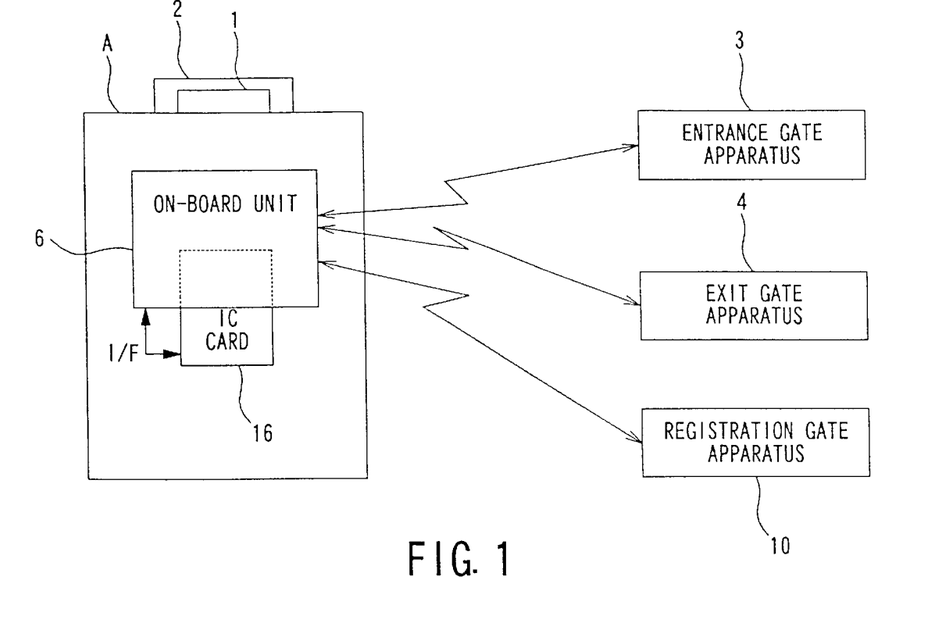
FIG. 1 is a block diagram showing the composition of the ETC system according to the first embodiment of the present invention.

As shown in FIG. 1, the ETC system comprises an on-board unit 6, an entrance gate apparatus 3, an exit gate apparatus 4 and a registering gate 10.

The on-board unit 6 is, for example, mounted on a vehicle that travels on a toll road such as express highway, and performs toll settlement by wireless communication at the tollgate at the entrance and the exit of the toll road.

The entrance gate apparatus 3 is installed at the tollgate of the entrance and writes in the data of the entrance in the IC card 16 set in the on-board unit 6 by communicating by wireless with the onboard unit 6 mounted on the vehicle A entering into the tollgate.

The exit gate apparatus 4 is installed at the tollgate of the exit and writes in the processing result at the exit in the IC card 16 by communicating by wireless with the on-board unit 6 mounted on the vehicle A exiting from the tollgate.

The registering gate apparatus 10 is installed, for example, at the shops such as car dealers and car shops or at agents, who mounts on-board units on vehicles, and performs setup for the on-board unit 6.

The vehicle A that is mounted with an on-board unit 6 in such a way is called as an ETC-vehicle.

At the place for a front number plate of the vehicle A, a number plate 2, which involves a wireless tag 1 that is stored with data peculiar to the vehicle in order to distinguish the vehicle A individually, is attached.

The wireless tag 1 is a device having a memory element such as memory, namely an IC chip, and an antenna coil transmitting the data of the IC chip as a response while resonating with a certain frequency radio wave signal.

The IC chip is stored with the data peculiar to the vehicle such as mentioned in the automobile inspection certificate (the owner, the number of vehicle, the outer dimensions, the weight, the type and the vehicle class and the like) as rewriting prohibited. In other words, as the wireless tag 1 is stored with data showing what type of vehicle the vehicle A is, an emergency vehicle, a sight seeing bus, a route buses, a special vehicle, a vehicle that is driven by physically handicapped person can be distinguished.

In the meantime, though in this instance, the number plate 2 is attached to the place for the number plate at front side of the bumper of the vehicle A, the number plate may be attached to the place for the number plate 2 at the rear bumper of the vehicle A.

Figure 2:
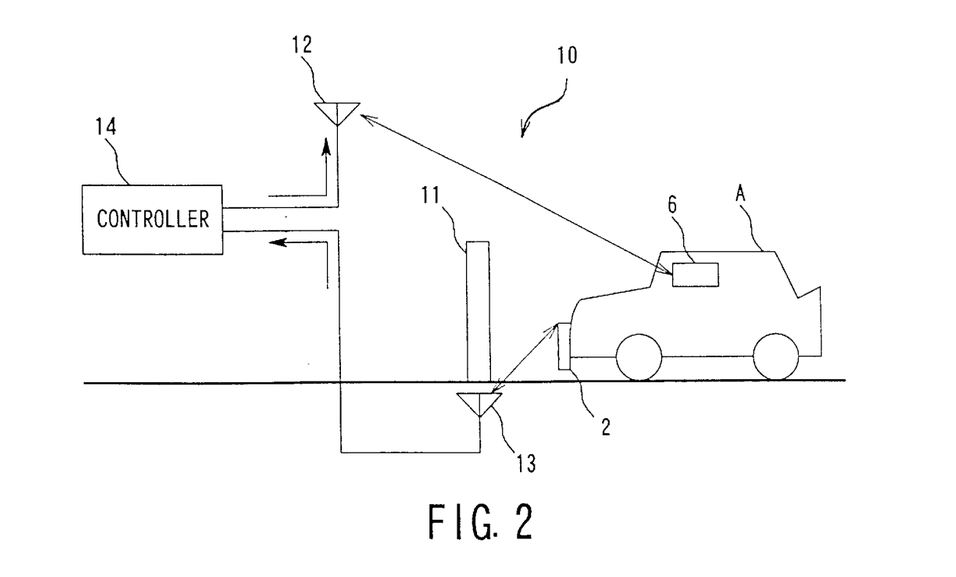
FIG. 2 is a schematic drawing showing the registering gate apparatus of the ETC system shown in FIG. 1.

The registering gate apparatus 10 comprises, as shown in FIG. 2, a vehicle sensor 11 that detects the entrance of the vehicle A and the height of the vehicle and the like, an antenna apparatus 12 transmitting and receiving data by communicating by wireless with the on-board unit 6, an antenna apparatus 13 that obtains data peculiar to the vehicle by communicating by wireless with the wireless tag 1, and a controller 14 which registers the data obtained through the wireless tag 1 by controlling the vehicle sensor 11, the antenna apparatus 12 and the antenna apparatus 13 in the on-board unit 6. The antenna apparatus 13 may be buried in the surface of the road or fixed to a position nearly same to the ground, and reads out the data from the wireless tag 1, when the wireless tag approaches within a certain range (a several meters).

Figure 3:
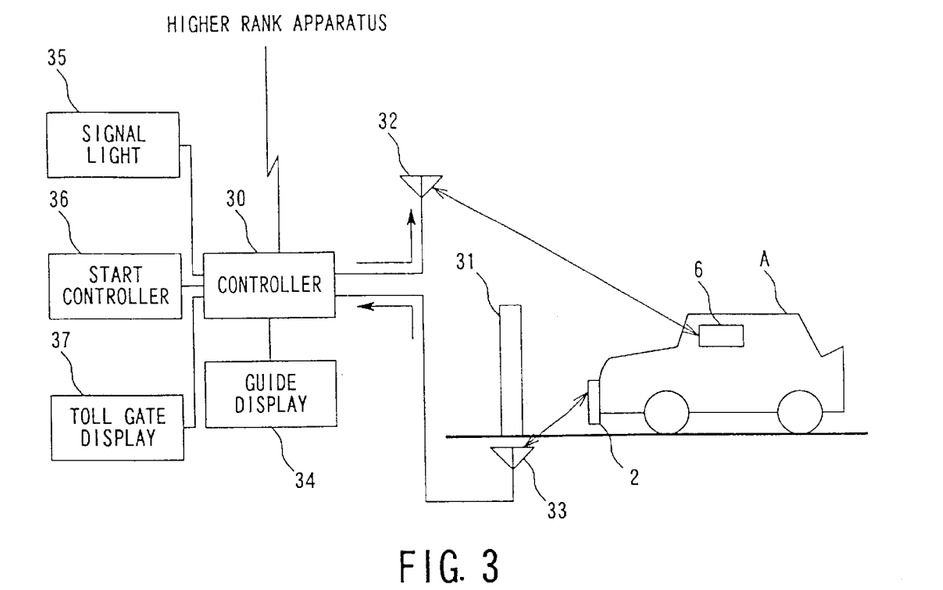
FIG. 3 is a schematic drawing showing the entrance gate apparatus and the exit gate apparatus of the ETC system shown in FIG. 1.

The entrance gate apparatus 3 and the exit gate apparatus 4 are installed in the lanes of the entrance and exit of the toll road respectively. The entrance gate apparatus 3 and the exit gate apparatus 4 comprise a vehicle sensor 31, an antenna apparatus 32, an antenna apparatus 33, a controller 30, a guide display 34, a signal lamp 35, a start controller 36 and a tollgate display 37.

The vehicle sensor 31 detects that a vehicle A enters into a lane.

The antenna apparatus 32 functions as a first wireless communication means which receives and transmits data by communicating by wireless with a on-board unit 6 mounted on the vehicle A that is detected by the vehicle sensor 31.

The antenna apparatus 33 is buried in the surface of the lane and functions as a second wireless communication means that obtains the data peculiar to the vehicle by communicating by wireless with the wireless tag 1 mounted on the vehicle A.

The controller 30 performs the ETC processing by judging whether or not ETC processing is possible basing upon the data obtained through wireless communication with the antenna apparatus 32 and the antenna apparatus 33.

The guide display 34 displays the judging result by the controller 30 and operation guide and the like.

The signal lamp 35 displays the YES/NO of the entrance into the lane, or YES/NO of the start from the lane by means of BLUE/RED lamps.

The start controller 36 stops the vehicle and permits the vehicle starts.

The tollgate display 37 indicates the tollgate.

The controller 30 is connected to the apparatus of a higher rank (the host computer) and the apparatus of a higher rank (the host computer) sends a reply to the inquiry (request for a verification of the user) issued by the controller 30 at the time of ETC processing. The antenna apparatus 32, the antenna apparatus 33 and the controller 30 are called as roadside apparatus. In case of toll system corresponding to travelling distance, the ETC processing is the processing for writing in the entrance data into the on-board unit 6 at the entrance gate 3 and the processing for performing the settlement of the toll corresponding to the travelling distance from the entrance by wireless communication with the on-board unit 6 at the exit gate.

Figure 4:
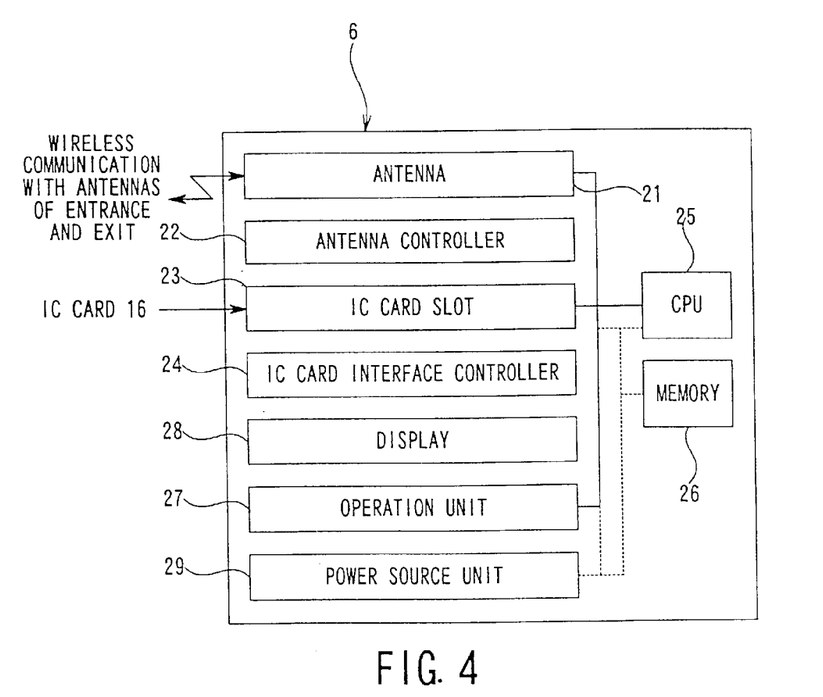
FIG. 4 is a block diagram showing the composition of the onboard unit used for the ETC system shown in FIG. 1.

The on-board unit 6, as shown in FIG. 4, comprises an antenna controller 22 performing wireless communication through an antenna 21 with the entrance gate apparatus 3, the exit gate apparatus 4 and the registering gate apparatus 10; an IC card interface controller 24 which exchanges data between the IC card slot 23 in which IC card 16 is set and the IC card 16 set in the IC card slot 23; a CPU 25 which processes the data read out through the IC card interface controller 24; a memory 26 which is the working area for CPU 25 to process the data and storing area for the various data; a controller 27 operated by the user; a display 28 showing the data processed by the CPU 25, operation guides and operating data of the controller 27; and a electric source 29 for supplying power to the above various sections.

The CPU 25 having a counter counts the number of the disagreement of the management number read out from IC card 16. The memory 26 is in advance as rewriting prohibited stored with ID-number (number of the on-board unit, the message authentication code) for distinguishing the on-board unit 6 from the other on-board units of the other vehicles. The CPU 25 setups (registers) any non-registered data obtained through the wireless communication with the registering gate apparatus 10, in case that at least any part of the data (length of the vehicle, height of the vehicle, number of axles, weight, application, special features and the like) included in the data peculiar to the vehicle A in which the on-board unit 6 is mounted, is not yet registered in the memory 26.

Figure 5:
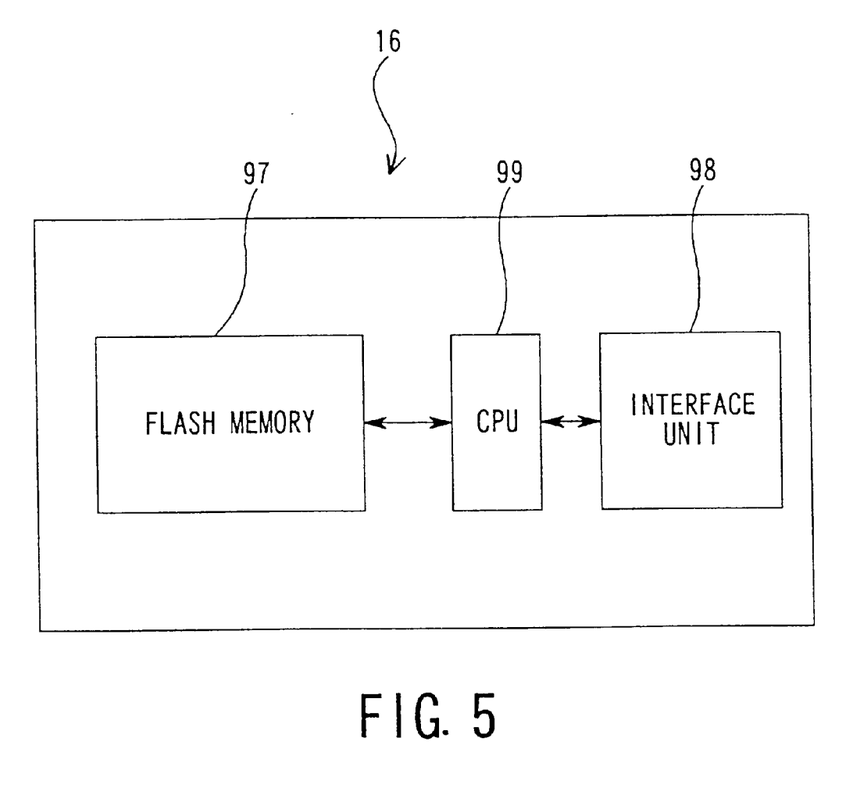
FIG. 5 is a block diagram showing the inside composition of the IC card to be set in the on-board unit shown in FIG. 4.

As shown in FIG. 5, the IC card 16 comprises an interface 98 which performs an exchange of the data between the flash memory 97 that is able to store and read out data and the IC card interface controller 24 of the on-board unit 6; and CPU 99 which controls this interface 98 and the flash memory 97. In the flash memory 97, at least ID numbers identifying the IC card 16 (number of the IC card and the message authentication code and the like) are stored in advance.

The IC card 16 is a card which is able to read out and write in and is stored with the travelling record such as the gate passing date and time, the gate number to specify the entrance gate (point information), vehicle class of the vehicle A and the balance of the card in relation with ID numbers. In the flash memory 97 of the IC card 16, the account number of the user, special contract data showing the propriety of the application of the reduction for physically handicapped persons are stored.

The IC card 16, when the same is set in the on-board unit 6, transmits the data for toll of the own flash memory 97 to the memory 26 on the side of the on-board unit 6 for the first time, after the justification of the on-board unit 6 is verified through the exchange of signals with the CPU 25 through IC card interface controller 24 of the on-board unit 6.

Hereinafter the ETC system of the embodiment of the present invention is described.

Figure 6:
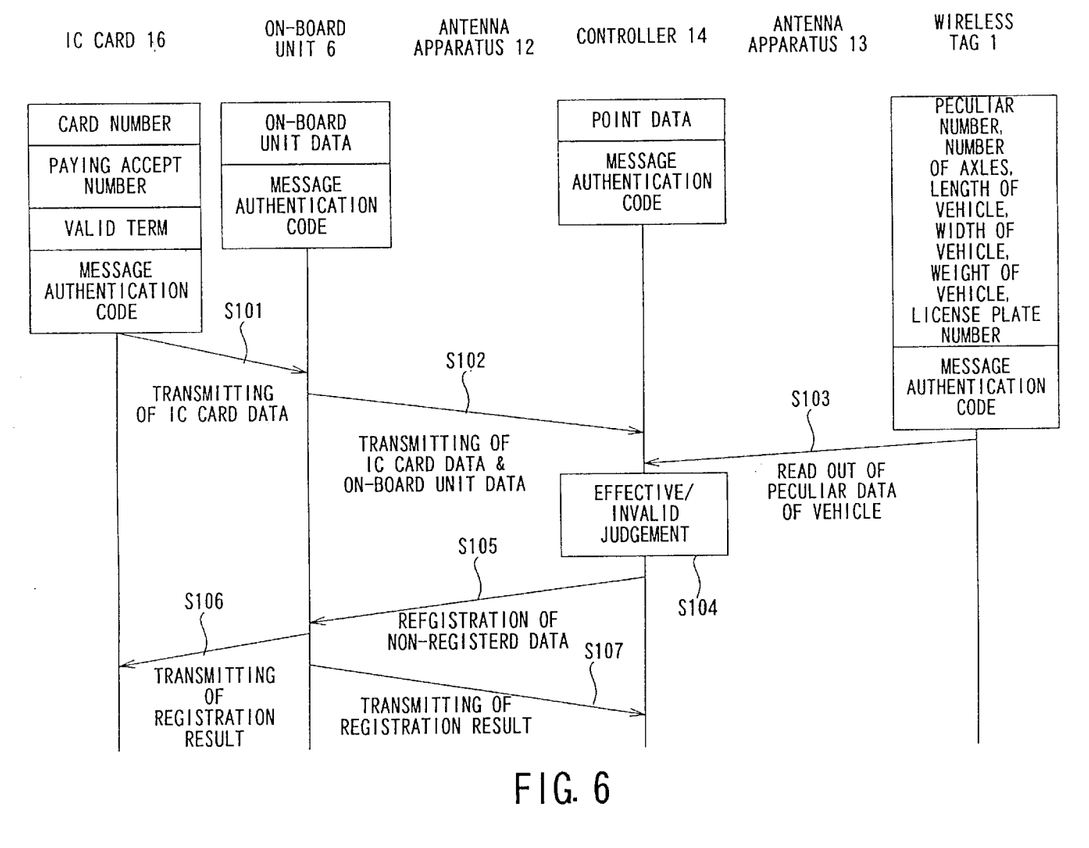
FIG. 6 is a sequence diagram showing the set-up process of the on-board unit.

FIG. 6 is the flow chart showing the setup behavior at the time of procurement of the on-board unit 6.

The on-board unit 6 cannot be used, when the on-board unit 6 is procured and is just mounted on the vehicle A.

Therefore, the user fills up the necessary items and the management number of the on-board unit in the application sheet which is attached to the procured on-board unit 6 and mails the same together with a copy of the vehicle inspection certificate of the vehicle A owned by the user to the ETC operating enterprise.

The ETC operating enterprise registers the user in the data base basing upon the data of the submitted application sheet, prepares an IC card 16 for toll collection for providing the ETC services and send the same card to the user. The data stored in the IC card 16 (hereinafter called IC card data) are number of card, number of the payment approval, valid date, message authentication code and the like.

When the user receives the returned IC card 16 and mounts the on-board unit 6 in the vehicle A and then sets the IC card 16 in the on-board unit 6, on the side of the on-board unit 6, IC card data of the IC card 16 is transferred to the on-board unit 6 (S101) and is read in the memory 26, as shown in FIG. 6.

Next, the user drives the vehicle A mounted with the on-board unit 6 to the place where the registering apparatus 10 is installed, namely to the dealer in the case of the present embodiment, and enters the vehicle into the registering gate apparatus 10.

At the registering gate apparatus 10, when the entrance of the vehicle A is detected by the vehicle sensor 11, the controller 14 performs the procurement of the data by controlling the antenna apparatus 12 and 13.

In this case, the controller 14, at first, starts the wireless communication with the on-board unit 6 by controlling the antenna apparatus 12 and the data stored in the memory 26 (IC card data+the data of the on-board unit) are transmitted from the on-board unit 6 to the controller 14 (S102).

Successively, the controller 14 performs the wireless communication by controlling the antenna apparatus 13 with the wireless tag 1 mounted on the number plate 2 and reads out the data peculiar to the vehicle (S103). In the meantime, if the vehicle is only one car, the data peculiar to the one vehicle is obtained and if the vehicle A trails an other vehicle (two vehicles train), data peculiar to the two vehicles can be obtained from the respective vehicles.

And then, the controller 14 judges whether or not the necessary data for the utilization of the services are registered in the on-board unit 6, basing upon the IC card data obtained from antenna apparatus 12 and the data peculiar to the vehicle obtained from antenna apparatus 13 and performs a judgement on effective/invalid (S104). This judgement on effective/invalid is to judge whether or not the necessary data for the utilization of the ETC-services are included in the data of on-board unit; whether or not the card number of the IC card data corresponds to the number of the on-board unit as the data of the on-board unit; whether or not the data on the owner of IC card data and the data on the owner of the data peculiar to the vehicle agree with. If the data necessary for the utilization of ETC services are not included, it means that the on-board unit 6 is not yet set up and that the necessary data are not yet registered.

As the result of judgement on effective/invalid, if the necessary data for the utilization of ETC services are not included in the data of the on-board unit, and the IC card data and the data peculiar to the vehicle as the owners data agree and the number of the IC card data and the number of the on-board unit of the on-board unit data correspond, setup of the unregistered data (card number, number of the on-board unit, data peculiar to the vehicle, point information data, data on the time and the like) in the on-board unit 6 is started.

In this case, the unregistered data are transmitted through the antenna apparatus 12 from the controller 14 to the on-board unit and are registered in the memory 26 (S105).

When unregistered data are registered in the memory 26 of the on-board unit 6, the data such as the card number, number of the on-board unit, the data peculiar to the vehicle, the point information, the time and the like are transmitted as the result of registration to the IC card 16 (S106) and the result of the registration is stored in the IC card 16, then thereafter, the utilization of ETC service becomes available. Also, at this moment, the on-board unit 6 transmits the registration result to the controller 14 (S107).

Figure 7:
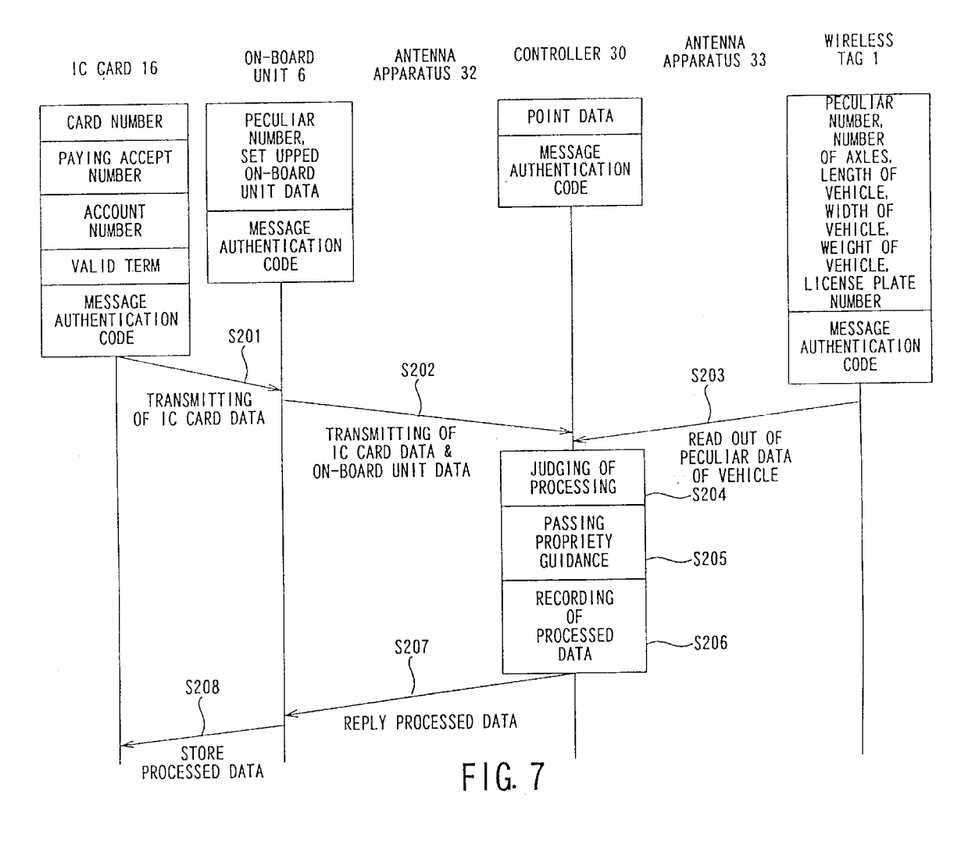
FIG. 7 is a sequence diagram showing the exit process of the ETC system.

Next, in the ETC system, ETC processing for the vehicle A, onboard unit of which has been setup is described by referring to FIG. 7. FIG. 7 is a sequence diagram showing the behavior of the various devices at the toll exit.

When IC card 16 is set into the on board unit 6 after the onboard unit 6 is setup with the various data, the data of IC card 16 are transmitted to the on-board unit 6.

Then, when the ETC vehicle A mounted with the on-board unit 6 enters into the entrance of the toll road, the controller 30 at the entrance gate apparatus 3 obtains the data of the on-board unit (including the data peculiar to the vehicle) from the on-board unit 6, while the vehicle A is detected by the sensor 31 when the vehicle A enters into the lane to the entrance and a wireless communication is held between the on-board unit 6 and the controller 30 of the exit gate apparatus 4 through the antenna apparatus 32. In this moment, if the communication can be performed each other normally, the vehicle is judged as an ETC vehicle.

Successively, the controller 30 reads out the data peculiar to the vehicle from the wireless tag 1 by wireless communication with the wireless tag 1 of the IC number 2 attached to the ETC vehicle A by controlling the antenna apparatus 33.

Then, the controller 30 transmits the entrance data to the onboard unit 6 through the antenna apparatus 32, when the data peculiar to the vehicle obtained by the respective antenna apparatus 32 and 33 are compared each other and agree each other. The onboard unit 6 transmits and stores the received entrance data to the IC card 16. Meantime the entrance data are the point information (name of the tollgate) and message authentication code and the like. Also it is also possible to take out the IC card 16 from the on-board unit 6 in the section of the toll road.

Then, when the IC card 16 is set into the on-board unit 6 when the ETC vehicle A exits from the toll road, the data of the IC card 16 is transmitted to the on-board unit 6 (S201 in FIG. 7). Meantime, if the IC card 16 has stayed as set in the on-board unit 6 from the entrance, this process is not performed.

Then, when the vehicle A enters into the lane for the exit is detected by the vehicle sensor 31, a wireless communication is performed between the on-board unit 6 and the controller 30 of the exit gate apparatus 4 through the antenna apparatus 32.

Then, if the communication could be performed normally, the IC card data such as the entrance data of the IC card 16, the data of the vehicle, the users ID and the data of the on-board unit are transmitted to the controller 30 (S202). The data of the on-board unit in this case mean the data including the data peculiar to the vehicle, which has been already setup in the on-board unit 6.

Successively, the controller 30 performs a wireless communication with the wireless tag 1 of the number plate 2 attached to the vehicle A by controlling the antenna apparatus 33, and the data peculiar to the vehicle are read out from the wireless tag 1 (S203).

Then, the controller 30 performs a judgement process basing upon the entrance data, data on the vehicle, the users ID, the data peculiar to the vehicle obtained by the respective antenna apparatus 32 an 33 (S204).

The judgement process in this connection means the judgement of the vehicle class, judgement of the travelling distance, terms of payment and the like. The judgement regarding the terms of payment is the process to be performed by inquiring the apparatus of the higher rank (the host computer), for example, search of the positive list, check of the negative list, check of the valid date and the like. The positive list is the list of the users who can use the onboard units properly. The negative list is the list of the users who cannot use on board units properly.

Then, in accordance with the judgement result the guidance as to the propriety of the passage is displayed on the guidance display 34 (S205).

Also, the processed data as the judgement result are stored as the log in the controller or transmitted to the apparatus of higher rank (the host computer) and are stored therein (S206) and, at the same time, are returned to the on-board unit 6 (S207). The processed data as the judgement result are, for example, the number of card, the number of the on-board unit, the ID of vehicle, the vehicle class, toll, the travelling distance and the like.

In the on-board unit 6, the processed data received are transferred to the IC card 16 and are stored therein (S208).

As described in the above, according to ETC system of the first embodiment of the present invention, after the on-board unit 6 is procured and is mounted in the vehicle A, the vehicle A is brought to the place where a registering gate apparatus 10 is installed and the vehicle is passed through the registering gate apparatus 10, the data are obtained through wireless communication from the wireless tag 1 of the IC number 2 attached to the vehicle A by the controller 14, the on-board unit 6 is automatically initially setup by the controller 14, in other words, the setup of the on-board unit 6 is performed. Accordingly, the setup work becomes easy for either users or the mounting agents; thus this embodiment may contribute to the generalization of the ETC services.

Also, in case of the ETC vehicle A, which on-board unit 6 is set up, the judgement on the vehicle class of the vehicle in question for the utilization can be made exactly by performing the judgement not from the outlook of the vehicle, but by obtaining the data peculiar to the vehicle from the wireless tag 1 attached to the number plate 2 at the entrance and the exit of the toll road. Accordingly, various sensors such as cameras for recognizing the number, sensor for the height of the vehicle are no more necessary and at the same time, the processing at the entrance and the exit can be fully automated.

Figure 8:
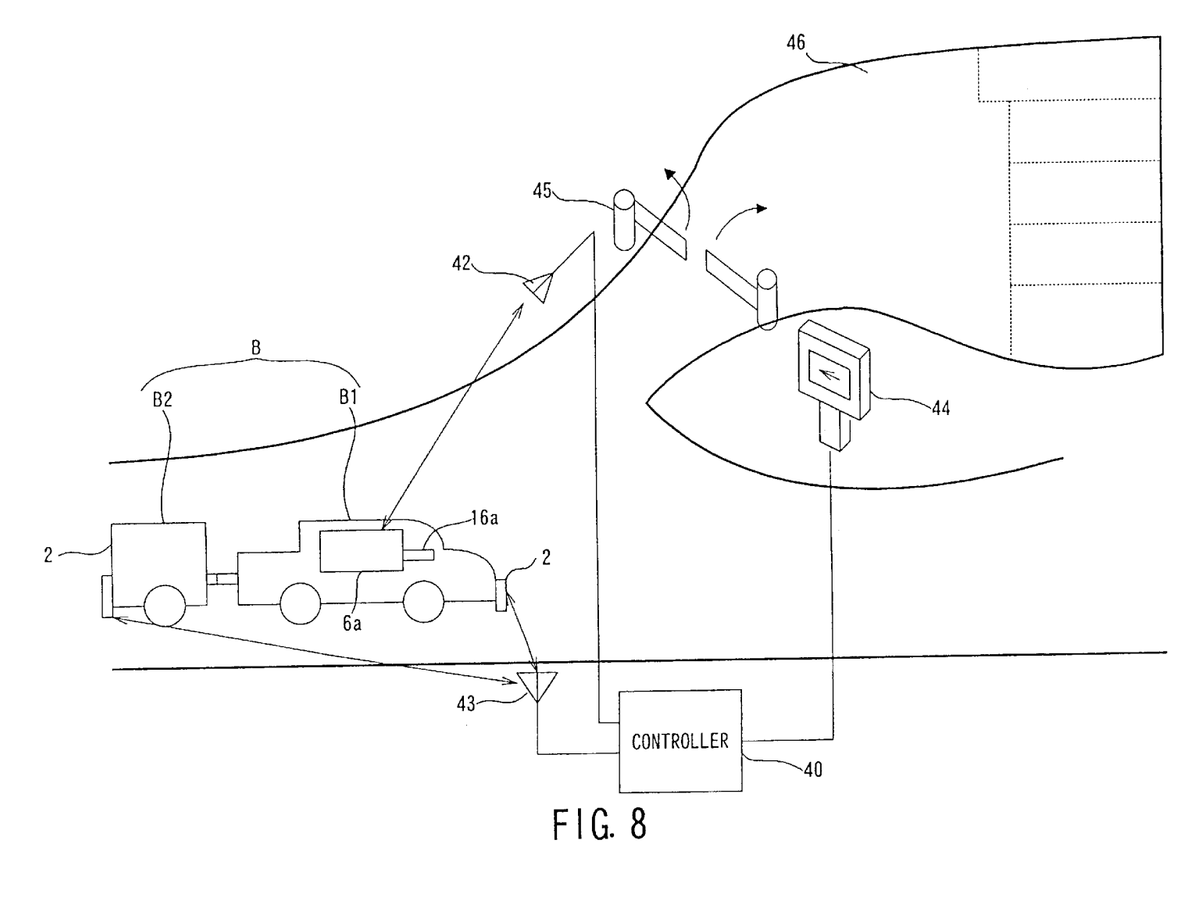
FIG. 8 is a schematic drawing showing the composition of gate apparatus for a parking lot according to a second embodiment of the present invention.
Figure 9:
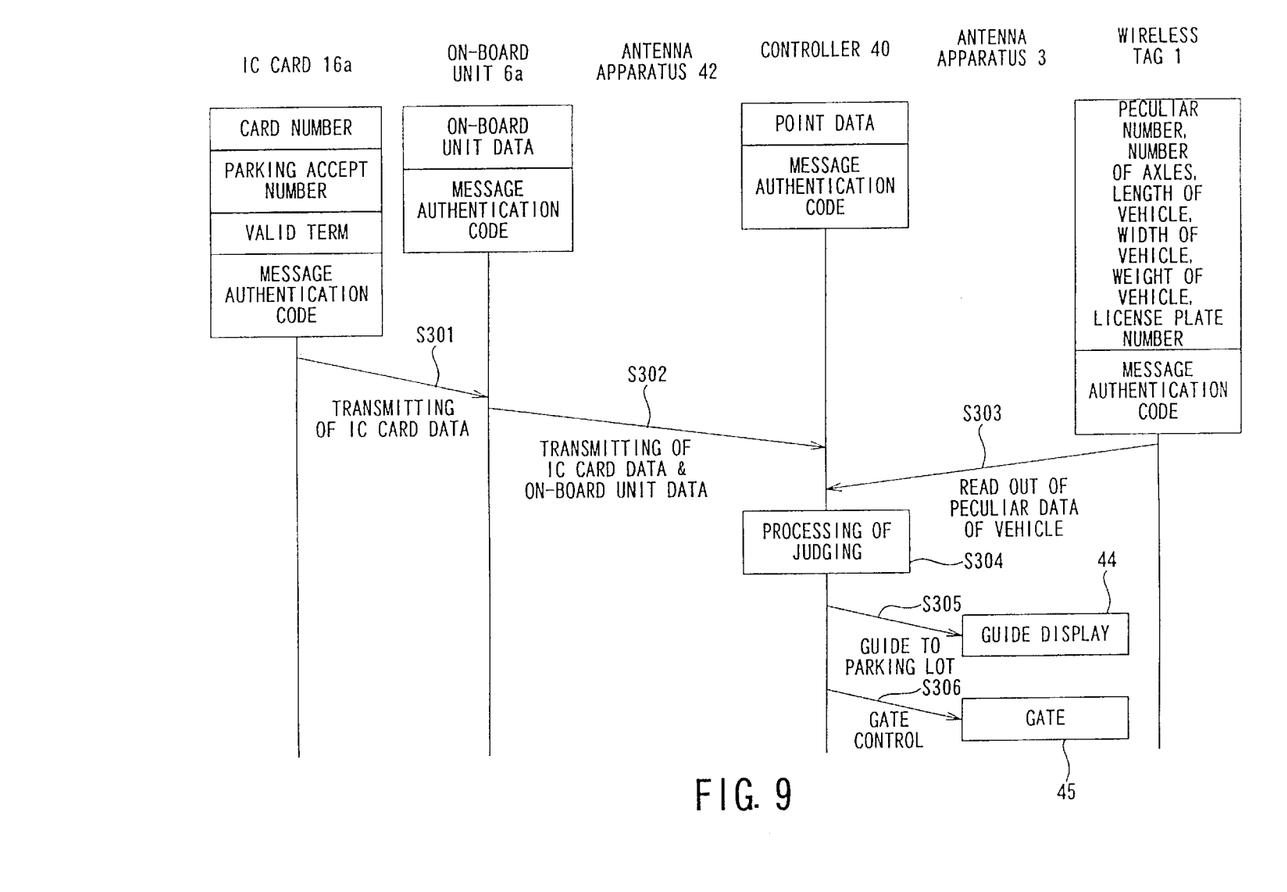
FIG. 9 is a sequence diagram showing the behavior of the gate apparatus for a parking lot shown in FIG. 8.

Successively, a second embodiment of the present invention is described by referring to FIGS. 8 and 9.

This second embodiment is supposed to be a parking lot as a toll facility, and is described as a gate apparatus for toll parking lot.

As shown in FIG. 8, this parking lot gate apparatus comprises an antenna apparatus 42, an antenna apparatus 43, a controller 40, a guidance display 44 and the barrier 45.

The antenna apparatus 42 is installed upward of the entrance and exit of the parking lot 46 and functions as first wireless communication means that transmits and receives data through the wireless communication with the on-board unit 6a mounted on the vehicle B.

The antenna apparatus 43 is buried in the surface of the road for the entrance and the exit of the parking lot, and functions as second wireless communication means for obtaining the data peculiar to the vehicle by wireless communication with the wireless tags 1 of the respective number plates 2 attached to the vehicles A1 and A2.

The controller 40 performs the judgement as to whether or not the vehicle is the one allowed to park basing upon the data obtained by communicating by wireless with the antenna apparatus 42 and 43, and in case of an allowed vehicle, the judgement as to in which position the vehicle shall park.

The guidance display 44 displays the guidance such as "parking permissible" and "position for parking" according to the judgement result by the controller 40.

The barrier 45 opens and closes the entrance and exit gate controlled by the controller 40.

The vehicle B is assumed in this case as a connected vehicle that the vehicle B1 trails the vehicle B2. The controller 40 is stored with data of the parking status in the parking place 46 and the data on the numbers of the contracted vehicles in advance. The data of the parking status comprise data on the spaces allowed for parking for respective vehicles, and data on flag showing that vehicle is parking and the like. The on-board unit 6a is provided with an IC card 16a. Though the on-board unit 6a may be of the same grade of the ETC system, as it is not necessary to have a security control as of the ETC system, the on board unit 6a may have just a wireless communication function with an antenna apparatus 42 for the purpose of parking only and a functions to write in and to read out the IC card 16a. The IC card 16a is stored with the IC card data such as card number, parking approved number, valid date, message authentication code and the like. The IC card data may be registered at the registering gate apparatus 10 as described in the above, or also may be registered in the IC card 16a in advance at the time of the contract for parking lot.

In the parking lot gate apparatus composed as described in the above, when the on-board unit 6a of the vehicle B is set with an IC card 16a, the IC card data of the IC card 16a are transmitted to the on-board unit 6a (S301).

And then, in case that the vehicle B mounted with the on-board unit 6a parks in the parking lot 46, and when the vehicle B arrives around the entrance and exit gate for parking lot 46, a wireless communication is held between the antenna apparatus 42 installed at the entrance and exit gate of the parking lot 46 and the on-board unit 6a of the vehicle B, and IC card data and the data of the onboard unit are obtained from the on-board unit 6a by the controller 40 through the antenna apparatus 42 (S302).

Almost in parallel with the wireless communication, a wireless communication is held between the antenna apparatus 43 and the respective IC numbers 2 of the vehicle B1 and B2, the data peculiar to the vehicle including vehicle number stored in the respective IC number 2 are obtained by the controller 40 through the antenna apparatus 43 (S303).

The controller 40 judges the propriety of parking basing upon the contents of IC data or the data of the on-board unit obtained from the on-board unit 6a and the contents of the data peculiar to the vehicle obtained from the respective IC numbers 2 (S304). In this case, the controller 40 judges whether or not the vehicle is a contracted vehicle by checking that the data of vehicle number with the number of the number plate included in the data peculiar to the vehicle by comparing the data each other and in case the contracted vehicle is in question, the parking position of the vehicle B is decided basing upon the data peculiar to the vehicle that are obtained from the wireless tag 1 attached to a plurality of the number plates 2.

As the result of the judgement, when the vehicle B is allowed to park, the guidance display 44 displays "parking allowed or "parking position" (S305) and at the same time, the entrance of the vehicle B is allowed by opening the entrance and exit of parking lot 46 by controlling the gate 45 (S306). And when the vehicle B is not allowed for parking, the guidance display 44 displays "parking not allowed" or displays nothing and leaves the gate 45 closed.

As described in the above, according to the parking lot gate apparatus of the second embodiment of the present invention, the IC card data are obtained from the on-board unit 6a through the antenna apparatus 42 and the data peculiar to the vehicle are obtained from the IC number 2 through antenna apparatus 43 and the propriety of the parking is judged. Therefore, detecting devices such as camera, vehicle sensors that detect the outlook of the vehicles are no more necessary, and the composition of the equipment can be simplified and the judgement on whether or not the vehicle B is a contracted vehicle for parking, and the appointment of the parking position can be made exactly.

As the result, the check and the management of the entrance and the exit of the vehicles B that utilize the parking lot can be automated completely.

Meantime, the present invention is not limited to the above embodiments.

Though in the above embodiments a registering gate apparatus 10 is provided for setup of the on-board unit 6 exclusively, the entrance gate apparatus 3 or the exit gate apparatus 4 may be provided with a function for setting up of the registering gate apparatus 10 additionally.

Meantime the above embodiments are described using an example of a toll road and a parking lot, it is not needless to say that the present invention can be applied also to toll bridges and the like.

Furthermore, though in the above embodiments one IC card 16 is used for both setup and toll collection, the IC cards may function for setup and toll collection separately.

As described in the above, according to the present invention, first wireless communication means that perform a wireless communication with the wireless tag of the number plate and second wireless communication means that perform a wireless communication with the on-board unit mounted on the vehicle are provided and, when a vehicle arrives and the second wireless communication means have procured the data of the on-board unit and when the data necessary data are not yet registered, in such a case as the on-board unit is registered with the data unregistered through the second wireless communication means, therefore, it is no more necessary for the user or the worker of the mounting agent to operate the on-board unit for setup and the setup work can be simplified.

Also, according to the present invention, first wireless communication means that perform a wireless communication with a wireless tag of the number plate, and second wireless communication means that perform wireless communication with the on-board unit are provided in a toll facility such as tollgate of the automatic toll collection system, and when the vehicle enters into the tollgate, a discrimination of the vehicle class and a judgement of the propriety of the utilization of the facility are performed basing upon the data of the on-board unit, the data of the IC card and the data peculiar to the vehicle procured by the first and second wireless communication means, and for the vehicle that is verified for utilization of the facility, the toll collection is performed in accordance with the vehicle class. Therefore, it is no more necessary to discriminate the vehicle class from the outlook by means of cameras and infrared sensors so that the composition of the equipment can be simplified and the vehicle class can be judged without fail and the toll collection process can be fully automated.

Further according to the present invention, first wireless communication means that perform a wireless communication with a wireless tag of the number plate, and second wireless communication means that perform a wireless communication with the on-board unit are provided in a toll facility such as entrance and exit gate of the parking lot and when the vehicle enters the parking lot, a discrimination of the vehicle class and a judgement of the propriety of the utilization of the facility are performed basing upon the data of the IC card and the data peculiar to the vehicle procured by the first and second wireless communication means. For the vehicle that is verified for the utilization of the facility, the judged result is displayed on the guidance display and the entrance and exit gate of the parking lot is opened for the vehicle allowed to utilize the facility. Therefore, the vehicle contracted with the parking lot can be judged without fail and the check of the entrance and the exit of the parking lot and management can be fully automated.

In other words, according to the present invention the data for the toll facilities or the data for utilizing the services can be easily setup, the present invention may contribute to the generalization of such services. Also the check and the management of the entrance and the exit of the vehicles that utilize the toll facilities can be automated completely.

What is claimed is:

1. A gate apparatus for judging the entrance and exit for registering vehicle data of a vehicle, which is attached associated with a wireless tag that is stored with a stores vehicle data peculiar to the vehicle and which uniquely identifies it, and, on which an on-board unit having a wireless communication function is mounted, comprising:

first wireless communication means for procuring the data peculiar to the vehicle by the wireless communicating with the wireless tag; and second wireless communication means for procuring the data of the on-board unit stored in the on-board unit and IC card data set in the on-board unit by the wireless communicating with the on-board unit;

checking means for judging whether or not the vehicle data can be registered by comparing the peculiar data obtained by the first wireless communication means and the IC card data; and registering means for registering the vehicle data into the on-board unit through the second wireless communication means when the checking means judges the vehicle data can be registered.

2. An apparatus as claimed in claim 1 further comprising:

judging means for discriminating a vehicle class and judging a propriety of the utilization of a facilities basing upon the IC card data and the data peculiar to the vehicle obtained through the first and the second wireless communication means.

3. An apparatus as claimed in claim 2 further comprising:

toll collection means for performing a toll collection process corresponding to the vehicle class judged for the vehicle allowed utilizing the facilities as the result of the checking means.

4. An apparatus as claimed in claim 2 further comprising:

guidance displaying means for displaying the judging result by the judging means.

5. An apparatus as claimed in claim 2 further comprising:

opening and closing means for opening the an entrance and exit gate for the facilities for the vehicle allowed utilizing the facilities as the checking result by the checking means based on judgment by the checking means.

6. An apparatus as claimed in claim 1, wherein the wireless tag is attached to a number plate.

7. An apparatus as claimed in claim 6, wherein data of the number plate is stored in the wireless tag.

8. An on-board unit, which is mounted on a vehicle attached with a wireless tag in which a data peculiar to the vehicle is stored, and which may utilize a contracted service after a data for the user of the vehicle to utilize the contracted service is registered in a memory, comprising:

wireless communication means for transmitting the data stored in the memory, in case the data is requested by wireless communication by a wireless apparatus of the contracted service presenting side before the registration; and registering means for registering an unregistered data in the memory, in case the unregistered data is answered back to the memory by wireless communication to the data transmitted by the wireless communication means.

9. A setup method of an on-board unit, which is mounted on a vehicle attached with a wireless tag in which a data peculiar to the vehicle is stored, and which may utilize a contracted service after the data for a user of the vehicle to utilize the contracted service is registered in a memory, comprising the steps of:

obtaining the data peculiar to the vehicle by wireless communicating with the wireless tag;

obtaining a data of the on-board unit stored in the on-board unit and an IC card data set in the on-board unit by the wireless communicating with the on-board unit;

judging whether or not an unregistered data can be registered by comparing the obtained data peculiar to the vehicle and the IC card data, when the data necessary for judging a utilization of the contracted service is not yet registered among the procured data of the on-board unit; and registering the necessary data included in the data peculiar to the vehicle into the an-board unit through the wireless communication, when the unregistered data can be registered as the result of the judging step.

10. A toll collecting method using an on-board unit, mounted on a vehicle attached with which has a wireless tag in which data peculiar to the vehicle is stored and, in which data for a user of the vehicle to utilize an automatic toll collection service is may be registered, the toll collection method comprising the steps of:

obtaining the data peculiar to the vehicle by wireless communicating with the wireless tag;

obtaining a data of the on-board unit stored in the on-board unit and an IC card data set in the on-board unit, by the wireless communicating with the on-board unit;

judging a discrimination of the vehicle class and a propriety of the utilization of the automatic toll collection service basing upon the procured data of the on-board unit and the IC card data and the data peculiar to the vehicle;

and performing toll collection process for the vehicle that may utilize the automatic toll collection service corresponding to the judged vehicle class as the result of the judging step, wherein the toll collecting method includes the following process:

obtaining the data peculiar to the vehicle by wireless communicating with the wireless lag;

obtaining a data of the on-board unit stored in the on-board unit and an IC card data set in the on-board unit by the wireless communicating with the on-board unit;

judging whether or not unregistered data can be registered by comparing the obtained data peculiar to the vehicle and the IC card data, when the data necessary for judging a utilization of the contracted service is not yet registered among the procured data of the on-board unit; and registering the necessary data included in the data peculiar to the vehicle into the on-board unit through the wireless communication, when the unregistered data can be registered as the result of the judging step.

* * * * *